Jan. 24, 1961  O. C. HOLDERER  2,968,873
CLINOMETER ASSEMBLY

Filed July 18, 1958

INVENTOR:
OSCAR C. HOLDERER
BY W. E. Thibodeau,
Victor L. Billings,
A. T. Dupont and
Alvin E. Moore,
ATTORNEYS.

Jan. 24, 1961   O. C. HOLDERER   2,968,873
CLINOMETER ASSEMBLY

Filed July 18, 1958   3 Sheets-Sheet 2

INVENTOR:
OSCAR C. HOLDERER

Jan. 24, 1961     O. C. HOLDERER     2,968,873
CLINOMETER ASSEMBLY

Filed July 18, 1958     3 Sheets-Sheet 3

INVENTOR:
OSCAR C. HOLDERER
BY W. E. Thibodeau,
Victor L. Billings,
A. T. Dupont and
Alvin E. Moore,
ATTORNEYS

United States Patent Office

2,968,873
Patented Jan. 24, 1961

2,968,873

CLINOMETER ASSEMBLY

Oscar C. Holderer, Rte. 3, Box 112, Huntsville, Ala.

Filed July 18, 1958, Ser. No. 749,568

10 Claims. (Cl. 33—207)

(Granted under Title 35, U.S. Code (1952), sec. 266)

The invention described herein may be manufactured and used by or for the Government for governmental purposes without the payment of any royalty thereon.

This invention relates to a clinometer assembly. This assembly comprises a clinometer that is adaptable for measuring the attitudes of various adjustable devices having varying surfaces of contact with the instrument. Examples of such devices are models of guided missiles, rockets and aircraft that are tested in wind tunnels. Such testing of models of various sizes and shapes frequently necessitates various adjustments of the attitude of the model being tested, relative to its pitch, yaw or roll axis. These changing adjustments of models that vary in shape and size make desirable a clinometer with a base that may be quickly changed to alter shape or other characteristics of its support, so that the instrument may be accurately used on any particular model.

It is therefore an object of this invention to provide an accurate and versatile clinometer that may be used to measure the inclination of a continuous plane or line or, alternatively, of a pair of planes, lines or points that are separated by an elevation that rises above the line of the measured inclination.

Another object of the invention is to provide an accurate clinometer that may be used, by quick adjustment of its base, to measure various inclinations of pairs of planes, lines or points of models of aircraft or missiles, said pairs being separated by elevated parts of varying heights and/or horizontal dimensions.

A further object of the invention is to provide a clinometer with a base that may be quickly changed from unfettered, straight-line contact with a continuous plane or line of a model, to likewise unfettered but interrupted-line contact with a pair of separated surfaces of a second model, and further to fettered, interrupted-line contact with a pair of surfaces of a third model.

The foregoing and other objects of this invention will become more fully apparent from the following detailed description of exemplary embodiments thereof and from the accompanying drawings, in which.

Figure 1:
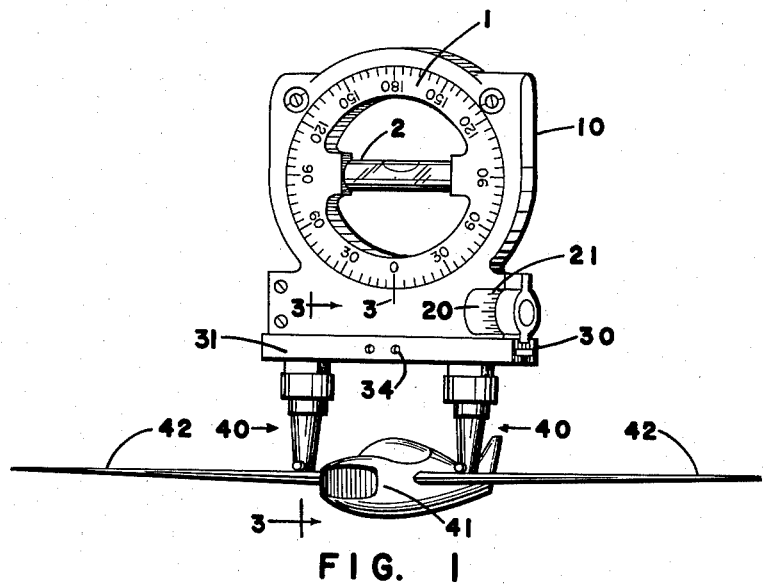
Fig. 1 is a view in elevation, slightly perspective, of a clinometer in manually supported, unfastened contact with the wings of an airplane model, whereby the bank or lateral inclination of the model, for instance in a wind tunnel, may be measured.
Figure 4:
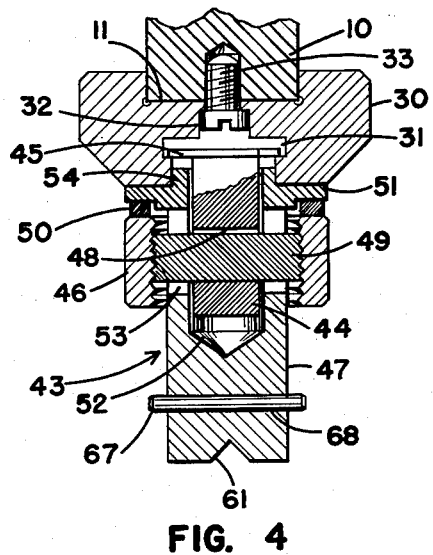
Fig. 4 is a detail view, in section along line 4—4 of Fig. 1, of the base portion of the clinometer, showing a means for clamping a leg of the base portion to a channeled base rail of the instrument.

As shown in Figs. 1 and 4, the clinometer comprises a rotary dial 1 that supports a spirit level 2, a housing 10 in which the dial is rotatably mounted, a knob 20 by which the dial may be turned, a base rail 30 having a T-shaped longitudinal slot 31, and optional, interchangeable supports 40 and 43 for resting or clamping the instrument in measuring position relative to models or other objects.

Elements 1, 2, 3, 10, 11 and 20 may be utilized as a complete clinometer by resting the flat bottom 11 of housing 10 on a surface, or a pair of surfaces not separated by elevations, that presents a single plane or line of contact along substantially the full length of the instrument. Then the knob 20 is turned until spirit level 2 is horizontal; and the divisional mark on the scale of dial 1 that is opposite mark 3 on housing 10 indicates the degrees and the reading of vernier scale 21 on knob 20 indicates the minutes of the inclination.

The same clinometer elements could be made to function, with more difficulty of alignment, in measuring inclinations of models or other objects having cylindrical and conical surfaces. In order to eliminate this difficulty of alignment, the clinometer of this invention is provided with a removable base portion or rail that is adapted for quick and accurate alignment of the instrument on cylindrical surfaces and which may be quickly detached and replaced by another base portion which will provide accurate alignment on either a conical or cylindrical surface, and which, optionally, may be held in place on said surface while the inclination of the surface is adjusted.

The removable base rail or channel 30 is attached to the base 11 of housing 10 by means of capscrew 33. The composite clinometer thus formed may be utilized without further change by placing it on the surface of the model or other object whose inclination is to be measured, adjusting the level, and reading the degrees and minutes of the inclination. In this form, the clinometer is accurate when used on a surface that is plane or cylindrical, but will not measure the inclination of a conical surface or of the axis of its cone.

Figure 2:
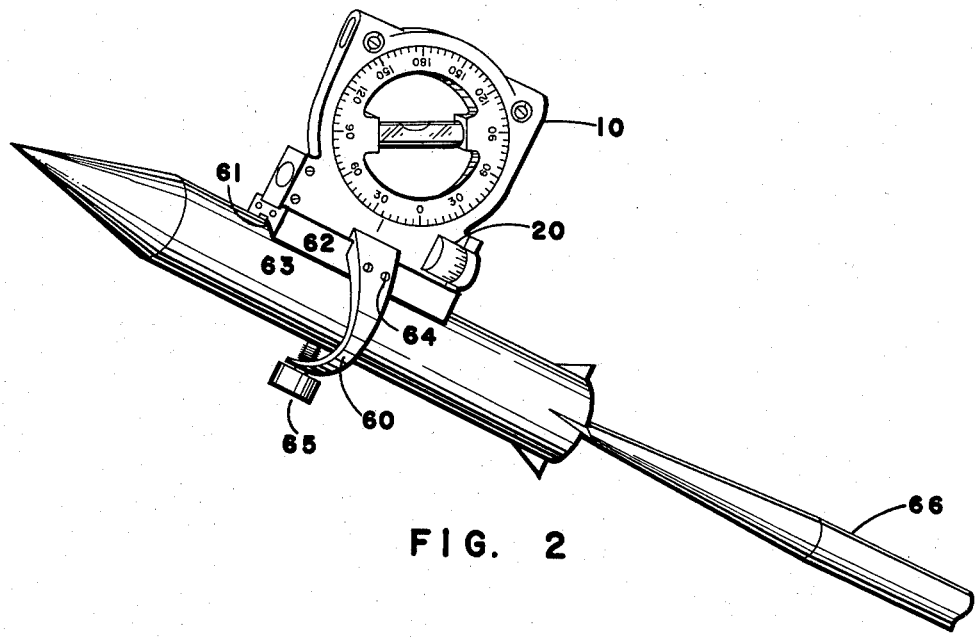
Fig. 2 is a view in elevation, slightly perspective, of the clinometer, shown as clamped to a missile model for measuring its inclination.
Figure 3:
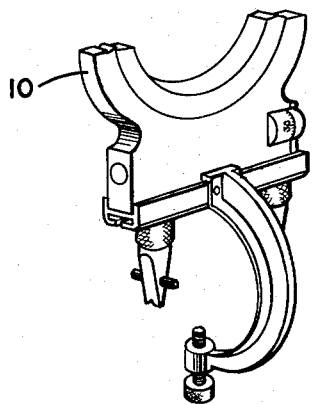
Fig. 3 is a view in elevation, slightly perspective, partly broken away, of the clinometer, similar to Fig. 1, but showing the C-clamp in place.

This incompatibility of the clinometer with conical objects may be eliminated by forming the groove in the base portion of the instrument in the form of a V, such as is shown at 61 in Fig. 2 or Fig. 4. Like the T-shaped groove 31, V-shaped groove 61 readily aligns the longitudinal center line of the rail or base portion 62 in a position that is parallel with the line of inclination of either the surface or the axis of a cylindrical object, such as the missile model 63 of Fig. 2. In the use of the clinometer in measuring the inclinations of conical objects, however, computations, depending on the angle of the V-shaped base and on the angle of the cone, are necessary to correct the reading and obtain accurate measurement of the inclination.

To provide interchangeability of the T-shaped and V-shaped channels, the invention comprises a countersunk hole 32 in rail 30, and a similar hole in rail 62, for the reception of the head of the capscrew 33.

Also there is provided on each of the rails 30 and 62 a pair of screwthreaded holes 34. When the clinometer, having either type of rail, is used for measuring the inclination of an object that has a curved surface but has no substantial obstruction on one of its sides (for example, a cone, or a cylindrical surface such as that of model 63), a clamp 60 may be placed on said side and fastened to rail 62 by means of screws 64. Knob 65 then may be turned to clamp the clinometer to the model or the like. Thereafter the inclination of the model (its attitude about its pitch axis) may be varied by adjusting the angle of inclination of member 66, which is an element of a known model-supporting mechanism used in wind tunnels. The point of member 66 is removably fixed within a recess in the model.

Within T-shaped channel 31 one or a pair of various types and sizes of supporting elements, for holding the clinometer on the object whose inclination is to be measured, may be mounted. In Fig. 1 there are shown two such supporting elements 40, of a height and distance apart which permit the clinometer base to clear the top and sides of an obstruction, such as the fuselage part 41 of the airplane model shown, while measuring the angle of inclination of two planes, such as the wings 42, that are separated by the obstruction.

One of the various supporting elements or composite legs, shorter than but otherwise similar to the legs 40, is shown in detail at 43 in Fig. 4. This composite leg comprises bolt element 44 that has a head 45 which may be inserted from either end of the rail into T-shaped channel 31, shifted along the rail to the desired position, and then clamped in position by means of nut 46, thus holding lower portion 47 of the composite leg rigid with respect to the upper part of the clinometer. Bolt element 44 has a rectangular slot 48 in which member 49, which is largely rectangular in cross section is mounted, so that it may be reciprocated longitudinally of bolt element 44, but is held against rotary movement relative to said bolt element. In cross section, member 49 is shaped as a portion of a circle, bounded by two chords and two arcs of the circle. Along the arcs of the circle there extend two screwthreaded portions which engage with the screwthreads of nut 46.

This nut supports, through spring washer 50, the flanged, upper head 51 of the lower leg portion 47. Portion 47 has a square or polygonal recess 52, in which bolt element 44 may reciprocate but is held against rotary movement, and also has a slot 53 through which the screwthreaded ends of member 49 project. The upper part 54 of leg portion 47 is of a square or polygonal configuration which provides planar contact with the lower walls of T-slot 31, to prevent rotation of element 47 relative to the rail.

Pin 67, which may be moved in or out of the drilled hole 68 in the lower portion of the composite leg may be used for engagement with line-establishing, drilled holes in a model or other object, thereby holding the clinometer in fixed relation to the model or other object.

Figure 5:
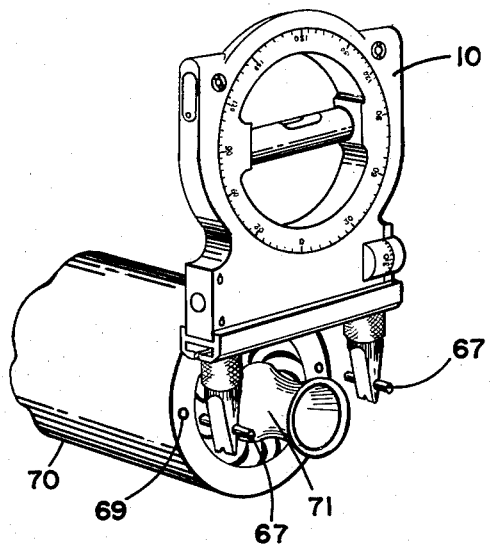
Fig. 5 is a perspective view of the clinometer, shown as including legs that are supported on the base of a missile or similar model.

An illustration of the various uses of the holding pins appears in Fig. 5, in which pins 67 are shown as about to be inserted into holes 69 at the base of missile model 70. After such insertion the upper portion of the clinometer spans and is clear of rocket motor portion 71 of the model.

Figure 6:
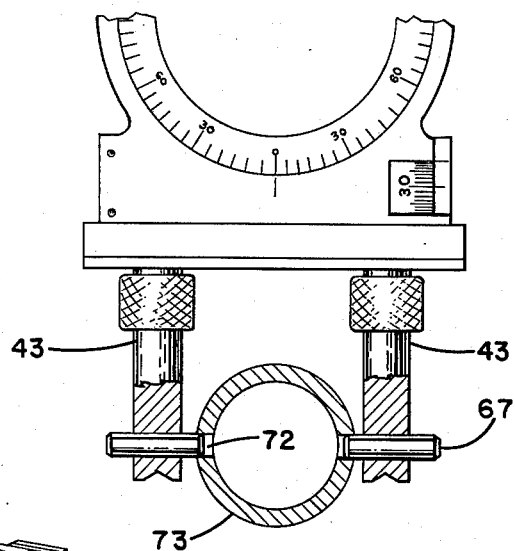
Fig. 6 is an elevational view of the clinometer, partly in section showing the legs of the clinometer as being turned 90 degrees from their Fig. 4 position and as supported on the sides of a missile or similar model.

Another illustration of such uses appears in Fig. 6, in which legs 43 are shown as having been rotated 90° from their position shown in Fig. 4. Such rotation is possible due to the cross-sectional configuration of part 54, which in this case is right-angled and has four sides, or a number of sides that is a multiple of two. Pins 67 are shown as inserted in holes 72 of a model of a missile or other curved-surface object 73.

Figure 7:
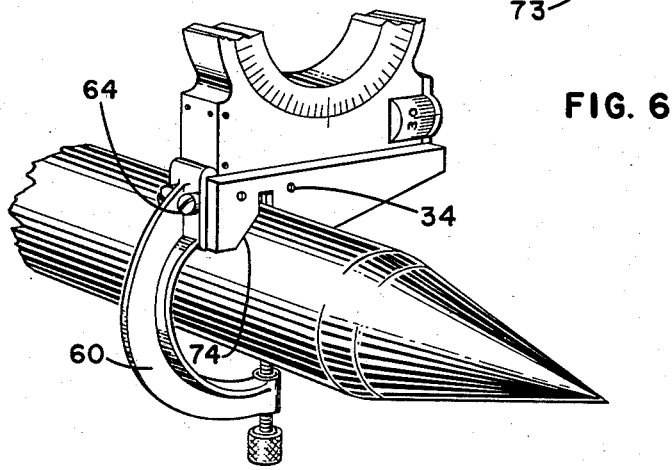
Fig. 7 is a perspective view of the clinometer, including a modification of the V-shaped base portion shown in Fig. 2.

Fig. 7 shows a detachable rail and clamp assembly of the general type of Fig. 2, modified for use in the measurement of the roll of a missile or similar model. The rail has a V-shaped groove 74 that is notched normally to the length of the rail. C-clamp 60, by which the clinometer is held on the model, is fastened to an end of the rail by means of screws 64.

Within the scope of the appended claims, the invention comprehends various obvious changes in the specific embodiments herein illustrated. For instance, it is obvious that, with some reduction in versatility of the clinometer, either of the rails 30 and 62 may be permanently fixed, as by welding, to housing 10.

The following invention is claimed:

1. A clinometer assembly, adapted for the measurement of inclinations of objects of various shapes, comprising: a composite frame having an upper portion with a flat bottom surface, and an elongated base-rail portion that is detachably fastened to said bottom surface and is shaped to form a downwardly opening recess, extending thruout the length of said base-rail portion, and to form inwardly directed flanges on each side of the bottom of said recess, a surface of said recess being adapted for inclination-measuring contact with a datum entity of a selective one of said objects, said composite frame further comprising mechanism detachably and adjustably mounted within said recess and on said flanges and means for adjusting said mechanism on and removably attaching it to said base-rail portion; a level-indicating device adjustably mounted on and supported wholly by said upper portion; actuating means mounted on and supported wholly by said upper portion, connected with said level-indicating device, for adjustment of said device into a horizontal position; and means, connected with said actuating means, for indicating inclination after said adjustment of said device; whereby: when said mechanism is fixed to said base-rail portion, the entire assembly may be used to measure inclination on one type of said objects; when said mechanism is detached, the remaining part of said assembly may be used to measure inclination on another type of said objects; and when said base portion is detached from said upper portion, said upper portion, level indicating device and inclination-indicating means may be used to measure inclination on a third type of said objects.

2. A device as set forth in claim 1, in which said mechanism is a pair of legs.

3. A device as set forth in claim 1, in which said mechanism comprises a leg of said frame, said leg having a lower surface adapted for inclination-measuring contact with a datum surface of a selective one of said objects while holding said base portion clear of contact with another, higher-elevation surface of said last-named selective one of said objects.

4. A device as set forth in claim 1, in which said mechanism comprises a pair of separated legs, having lower surfaces adapted for inclination-measuring contact with datum surfaces of a selective one of said objects, and having a gap between the legs adapted to clear said base portion from contact with an elevation between said datum surfaces.

5. A device as set forth in claim 4, in which said downwardly opening recess has a cross section that is narrower at the base than at an upper portion of the recess, thus providing ledges at the base of the recess that project toward each other, said ledges and recess having a selective function of providing said first-mentioned, optional, inclination-measuring contact and having a further function of removably supporting said legs, and in which said legs have flanged heads that fit against said ledges, and in which said means for removably attaching said mechanism comprises means for clamping said heads in adjusted position on said ledges.

6. A device as set forth in claim 5, in which said clamping means comprises resilient means for frictionally holding said heads against said ledges.

7. A device as set forth in claim 6, which comprises means for adjustment of the clamping force of said resilient means on said heads.

8. A device as set forth in claim 7, in which said means for adjustment comprises a nut.

9. A device as set forth in claim 7, in which each of said legs further comprises an upper portion, to which said head is fixed, and a lower portion telescoped there-with, and in which said means for adjustment comprises a nut, in engagement with said resilient means, which has screwthreaded engagement on a member attached to said upper portion.

10. A device as set forth in claim 4, in which each of said pair of legs has a lower portion that is provided with a pin, fitting in a hole in said lower portion, said pins being movable for insertion into reference holes in an object whose inclination is to be measured.

References Cited in the file of this patent

UNITED STATES PATENTS

| | | |
|---|---|---|
| 898,092 | Carrier | Sept. 8, 1908 |
| 1,278,148 | Heusser | Sept. 10, 1918 |
| 2,234,436 | King | Mar. 11, 1941 |
| 2,824,381 | Traupmann | Feb. 25, 1958 |